(12) United States Patent
Wang

(10) Patent No.: US 7,805,599 B2
(45) Date of Patent: *Sep. 28, 2010

(54) EXPANSION DEVICE FOR BIOS CHIP

(75) Inventor: Yong-An Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 613 days.

This patent is subject to a terminal disclaimer.

(21) Appl. No.: 11/757,406

(22) Filed: Jun. 4, 2007

(65) Prior Publication Data

US 2008/0162912 A1 Jul. 3, 2008

(30) Foreign Application Priority Data

Dec. 29, 2006 (CN) .................. 2006 2 0145404 U

(51) Int. Cl.
*G06F 9/445* (2006.01)
(52) U.S. Cl. .............................................. 713/1; 713/2
(58) Field of Classification Search ...................... 713/1, 713/2
See application file for complete search history.

(56) References Cited

U.S. PATENT DOCUMENTS

| | | | | |
|---|---|---|---|---|
| 5,410,707 A * | 4/1995 | Bell | ............................. | 713/2 |
| 5,471,674 A * | 11/1995 | Stewart et al. | ................. | 713/2 |
| 5,579,522 A * | 11/1996 | Christeson et al. | ............. | 713/2 |
| 5,815,706 A * | 9/1998 | Stewart et al. | ................. | 713/2 |
| 5,933,652 A * | 8/1999 | Chen et al. | ...................... | 710/1 |
| 6,081,891 A * | 6/2000 | Park | ............................. | 713/2 |
| 6,154,834 A * | 11/2000 | Neal et al. | ................... | 712/248 |
| 6,157,559 A * | 12/2000 | Yoo | ........................... | 365/52 |
| 6,904,484 B1 * | 6/2005 | Nelson | ....................... | 710/300 |
| 7,100,087 B2 * | 8/2006 | Yang et al. | .................... | 714/36 |
| 7,188,235 B2 * | 3/2007 | Wang et al. | .................... | 713/1 |
| 2003/0028800 A1 * | 2/2003 | Dayan et al. | ................ | 713/200 |
| 2007/0094487 A1 * | 4/2007 | Lee | ............................... | 713/1 |
| 2007/0174704 A1 * | 7/2007 | Shih | .............................. | 714/36 |
| 2007/0192582 A1 * | 8/2007 | Agan et al. | .................... | 713/2 |
| 2008/0209198 A1 * | 8/2008 | Majni et al. | .................... | 713/2 |
| 2010/0017591 A1 * | 1/2010 | Smith et al. | .................... | 713/2 |

* cited by examiner

*Primary Examiner*—Thomas Lee
*Assistant Examiner*—Zahid Choudhury
(74) *Attorney, Agent, or Firm*—Frank R. Niranjan

(57) ABSTRACT

A BIOS chip expansion card for starting a computer when the computer needs to be tested, includes a BIOS chip for starting the computer a first connector configured for connecting with a motherboard of the computer, and a switch member connected to the BIOS chip and the first connector for controlling communication therebetween, thereby controlling communication between the BIOS chip and the motherboard of the computer. Wherein when the BIOS chip communicates with the motherboard, the computer is started via the BIOS chip so that the computer can be tested.

2 Claims, 2 Drawing Sheets

EXPANSION DEVICE FOR BIOS CHIP

BACKGROUND OF THE INVENTION

1. Field of the Invention

The present invention relates to expansion devices, particularly to a BIOS (Basic Input/Output System) chip expansion device for testing a computer.

2. Description of Related Art

Basic Input/Output System (BIOS) stores the most important programs of a computer. Contents of a BIOS are integrated in a Read Only Memory (ROM) to form a BIOS chip. BIOS chips play an important role in starting and controlling a computer. When a computer is produced, tests are usually performed to confirm the computers operability. Thus, the computer may need to be started repeatedly, and the BIOS chip on the motherboard of the computer is accessed frequently. It is easy to damage the data in the BIOS chip on the motherboard and affect the computer quality. In addition, if the data in the BIOS chip is damaged, the computer cannot be started normally. Conventional method for restoring the BIOS chip is to replace the original BIOS chip with a new one. However, the BIOS chip is generally welded on the motherboard. It is difficult and inconvenient to mount a new BIOS chip.

What is needed, therefore, is a BIOS chip expansion device capable of starting the computer instead of the BIOS chip on the motherboard of the computer, and capable of restoring the damaged BIOS chip of the computer.

SUMMARY OF THE INVENTION

A BIOS chip expansion card for starting a computer when the computer needs to be tested, includes a BIOS chip for starting the computer, a first connector configured for connecting with a motherboard of the computer, and a switch member connected to the BIOS chip and the first connector for controlling communication therebetween, thereby controlling communication between the BIOS chip and the motherboard of the computer. Wherein when the BIOS chip communicates with the motherboard, the computer is started via the BIOS chip so that the computer can be tested.

Other advantages and novel features of the present invention will become more apparent from the following detailed description of preferred embodiment when taken in conjunction with the accompanying drawings, in which:

DETAILED DESCRIPTION OF THE INVENTION

Figure 1:
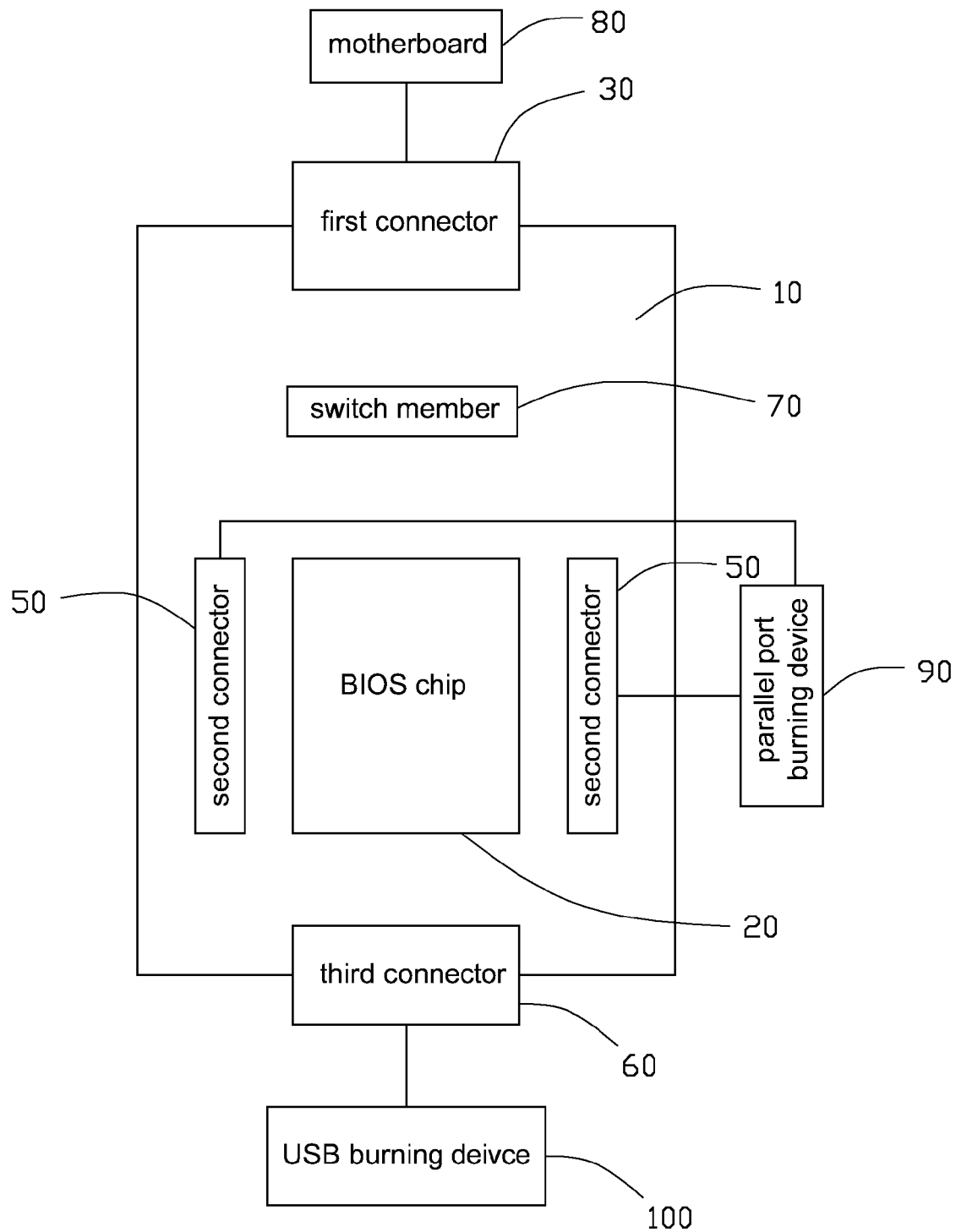
FIG. 1 is a configuration diagram of an expansion device for a BIOS chip in accordance with a preferred embodiment.

Referring to FIG. 1, an expansion device for BIOS chip in accordance with an embodiment includes a plate 10, a BIOS chip 20 disposed on a center of the plate 10, a first connector 30 disposed at one end of the plate 10 for being connected to a motherboard 80, a pair of second connectors 50 disposed at two opposite sides of the plate 10 around the BIOS chip 20, a third connector 60 disposed at the other end of the plate 10 opposite to the first connector 30, and a switch member 70 disposed between the first connector 30 and the BIOS chip 20. The second connectors 50 are connected to a first burning device such as a parallel port burning device 90 communicating with a computer via a parallel port. The third connector 60 is connected to a second burning device such as a USB burning device 100 communicating with a computer via a USB (Universal Serial Bus) port. The BIOS chip 20 is connected to the first, second and third connectors 30, 50, and 60. The switch member 70 controls connection between the first connector 30 and the BIOS chip 20, thereby controlling communication between the BIOS chip 20 and the motherboard 80.

Figure 2:
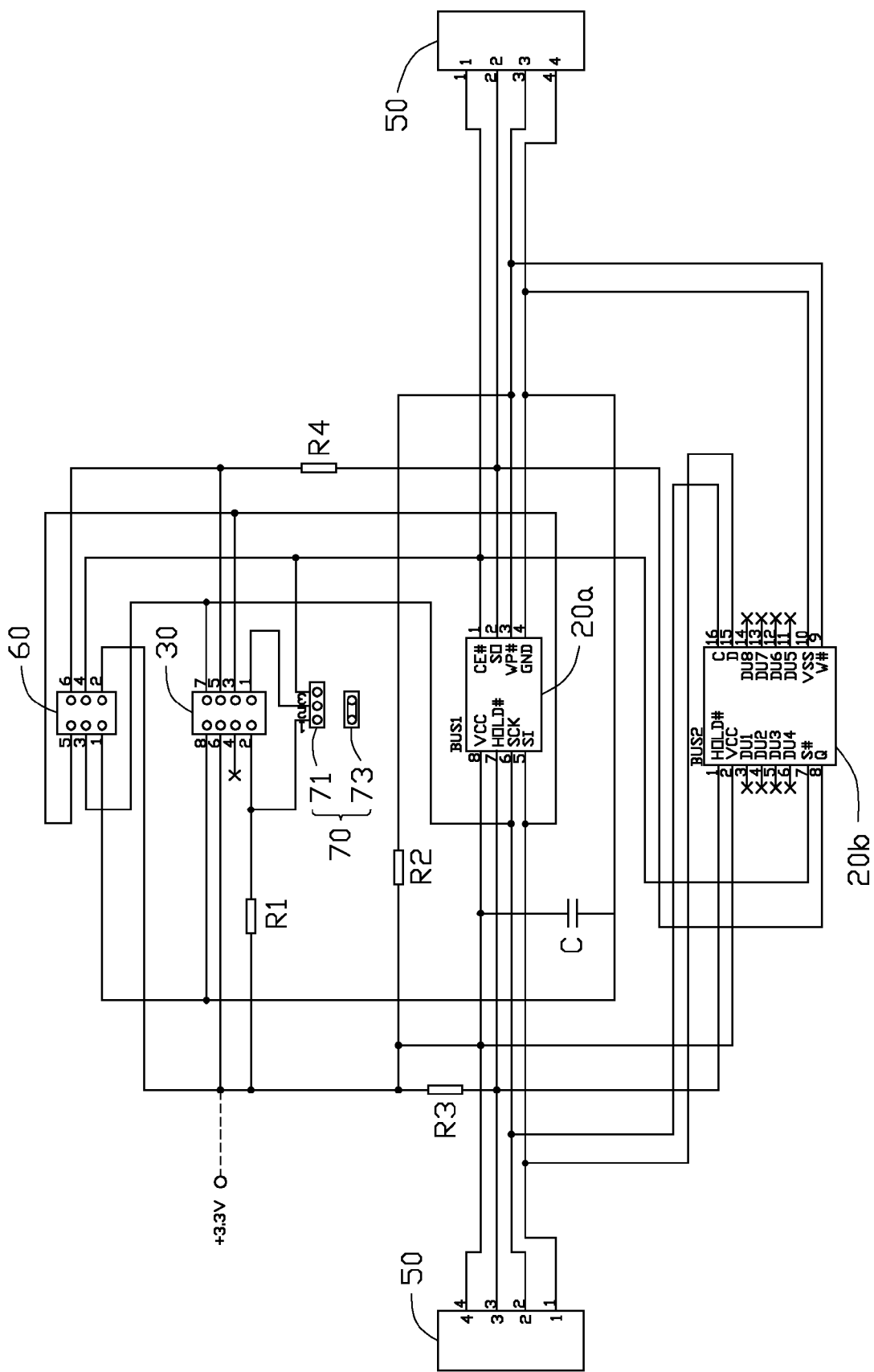
FIG. 2 is a circuit diagram of the expansion device for the BIOS chip of FIG. 1.

Referring also to FIG. 2, the BIOS chip 20 may be an 8 pin-chip 20a or a 16 pin-chip 20b. In use, only one type of chip is mounted on the plate 10 as in FIG. 1. Pin 1 of the 8-pin chip 20a is a signal choosing terminal CE#, pin 2 is an output terminal SO, pin 3 is a write protecting terminal WP#, pin 4 is ground terminal GND, pin 5 is an input terminal SI, pin 6 is a clock signal terminal SCK, pin 7 is a hold signal terminal HOLD#, and pin 8 is a voltage source terminal VCC. Functions of pins 1, 2, 7, 8, 9, 10, 15, and 16 of the 16-pin chip 20b respectively correspond to those of the pins 7, 8, 1, 2, 3, 4, 5, and 6 of the 8-pin chip 20a. The first connector 30 has 8 pins. Each second connector 50 has 4 pins. The third connector 60 has 6 pins. The switch member 70 includes a header 71 with 3 pins 1, 2, and 3 and a jumper 73 may be coupled to the header 71 by insertion of two adjacent pins thereof.

Pin 1 of the first connector 30 is connected to a middle pin 2 of the header 71 of the switch member 70. Pin 3 of the header 71 is connected to pin 1 (CE#) of the 8-pin BIOS chip 20a or pin 7 (S#) of the 16 pin-chip 20b. Pin 2 of the first connector 30 is connected to pin 1 of the header 71, and further connected to pin 6 of the first connector 30 via a resistor R1. When the first connector 30 is inserted onto the motherboard 80, pin 6 of the first connector 30 is connected to a 3.3V voltage source (broken line), and pin 2 is connected to a signal choosing terminal (not shown) of a BIOS chip on the motherboard 80. Pin 8 (VCC) of the 8-pin BIOS chip 20a or pin 2 (VCC) of the 16-pin BIOS chip 20b is connected to pin 6 of the first connector 30. Pins 3 (WP#) and 7 (HOLD#) of the 8-pin BIOS chip 20a or pins 9 (W#) and 1 (HOLD#) of the 16-pin BIOS chip 20b are connected to pin 6 of the first connector 30 via resistors R2 and R3 respectively. Pin 2 (SO) of the 8-pin BIOS chip 20a or pin 8 (Q) of the 16-pin BIOS chip 20b are connected to pin 5 of the first connector 30 via a resistor R4. Pin 4 (GND) of the 8-pin BIOS chip 20a or pin 10 (VSS) of the 16-pin BIOS chip 20b are connected to pin 8 of the first connector 30, and pin 4 of the 8-pin BIOS chip 20a is also connected to pin 8 of the first connector 30 via a capacitor C. Pin 5 (SI) of the 8-pin BIOS chip 20a or pin 15 (D) of the 16-pin BIOS chip 20b are connected to pin 3 of the first connector 30. Pin 6 (SCK) of the 8-pin BIOS chip 20a or pin 16 (C) of the 16-pin BIOS chip 20b are connected to pin 7 of the first connector 30.

Pin 3 (WP#) of the 8-pin BIOS chip 20a or pin 9 (W#) of the 16-pin BIOS chip 20b are connected to pin 2 of the third connector 60 via the resistor R2. Pin 7 (HOLD#) of the 8-pin BIOS chip 20a or pin 1 (HOLD#) of the 16-pin BIOS chip 20b are connected to pin 2 of the third connector 60 via the resistor R3. Pin 4 (GND) of the 8-pin BIOS chip 20a or pin 10 (VSS) of the 16-pin BIOS chip 20b are connected to pin 1 of the third connector 60 and pin 2 of the third connector 60 via the capacitor C. Pin 8 (VCC) of the 8-pin BIOS chip 20a or pin 2 (VCC) of the 16-pin BIOS chip 20b are connected to pin 2 of the third connector 60. When the third connector 60 is inserted onto the USB burning device 100, pin 2 of the third connector 60 is connected to a 3.3V voltage source. Pin 6 (SCK) of the 8-pin BIOS chip 20a or pin 16 (C) of the 16-pin BIOS chip 20b are connected to pin 3 of the third connector 60. Pin 1 (CE#) of the 8-pin BIOS chip 20a or pin 7 (S) of the 16-pin BIOS chip 20b are connected to pin 4 of the third connector 60. Pin 5 (SI) of the 8-pin BIOS chip 20a or pin 15 (D) of the 16-pin BIOS chip 20b are connected to pin 5 of the third connector 60. Pin 2 (SO) of the 8-pin BIOS chip 20a or pin 8 (Q) of the 16-pin BIOS chip 20b are connected to pin 6 of the third connector 60.

Wherein pins 1, 2, 3, and 4 of one of the second connectors 50 are respectively connected to pins 1, 2, 3, and 4 of the 8-pin BIOS chip 20a or pins 7, 8, 9 and 10 of the 16-pin BIOS chip 20b. Pins 1, 2, 3, and 4 of the other second connector 50 are respectively connected to pins 5, 6, 7, and 8 of the 8-pin BIOS chip 20a or pins 15, 16, 1, and 2 of the 16-pin BIOS chip 20b. The two 4-pin second connectors 50 can be replaced by an 8-pin connector.

When a computer needs to be tested, the BIOS chip expansion device can be used to setup a computer, thereby preventing the BIOS chip on the computer motherboard 80 being accessed too many times. When in use, the first connector 30 of the BIOS chip expansion device is connected to a corresponding port of the motherboard 80. Then the jumper 73 is inserted in pins 2 and 3 of the header 71. Thus, pin 1 of the first connector 30 communicates with pin 1 (CE#) of the 8-pin BIOS chip 20a or pin 7 (S#) of the 16-pin BIOS chip 20b. A low level signal is transmitted to pin 1 (CE#) of the 8-pin BIOS chip 20a or pin 7 (S#) of the 16-pin BIOS chip 20b. The choosing signal from the signal choosing terminal of the BIOS chip 20 becomes low level. Then, the computer is started via the BIOS chip 20 on the BIOS chip expansion device. The second usage of the BIOS chip expansion device is described as follows: If the data in the BIOS chip of the computer motherboard 80 are damaged, the computer can be started by the preceding method. Then, the data in the BIOS chip of the computer motherboard 80 is restored according to the contents of the BIOS chip on the BIOS chip expansion device. When testing a start-up function of the computer and needing to access the BIOS chip on the motherboard 80 directly, the jumper 73 is inserted in the pins 1 and 2 of the header 71. At this time, pin 1 of the first connector 30 is connected only to pin 2 of the first connector 30. The low level signal is transmitted to pin 2 of the first connector 30 from the pin 1 thereof, thereby the choosing signal from the signal choosing terminal of the BIOS chip on the motherboard 80 becomes low level. Thus, the computer is started via the BIOS chip on the motherboard 80.

When the contents in the BIOS chip 20 of the BIOS expansion device are lost or damaged, the BIOS chip expansion device is first disconnected from the motherboard 80. Then the two second connectors 50 are inserted in the parallel port burning device 90 to restore the data of the BIOS chip 20 on the BIOS expansion device. Then, the BIOS expansion device is reconnected to the motherboard 80, and testing may continue. Alternatively, the third connector 60 can be connected to the USB burning device 100 to restore the data of the BIOS chip 20 on the BIOS expansion device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A BIOS expansion device, comprising:
a BIOS chip configured to start a computer;
a first connector configured to couple with a motherboard of the computer; and
a switch member connected between the BIOS chip and the first connector, the switch member comprising a header and a jumper, wherein the jumper is capable of coupling to the header to cause the BIOS chip to communicate with the motherboard of the computer to start the computer, wherein the header comprises 3 pins, the jumper is capable of optionally connecting with any two adjacent pins of the header, to connect the BIOS chip to the motherboard to start the computer; the first connector comprises 8 pins, and a first one of the pins is connected to a middle pin of the header, and a second one of the pins is connected to a pin of the header adjacent to the middle pin; the other pin of the header is connected to a signal choosing terminal of the BIOS chip.

2. A BIOS expansion device, comprising:
a BIOS chip configured for starting a computer;
a first connector for establishing communication between the BIOS chip and the computer;
at least one second connector configured for connecting the BIOS chip to a burning device for restoring data of the BIOS chip when the data of the BIOS chip is damaged or lost; and
a switch member connected between the BIOS chip and the first connector, the switch member comprising a header and a jumper, wherein the jumper is capable of coupling to the header to cause the BIOS chip to communicate with the motherboard of the computer to start the computer, wherein the switch member comprises a header with 3 pins and a jumper, the jumper is configured for optionally being connected to any two adjacent pins of the header for connecting the pins together; the first connector comprises 8 pins, and a first one of the pins is connected to a middle pin of the header, and a second pin of the first connector is connected to a pin of the header adjacent to the middle pin; the other pin of the header is connected to a signal choosing terminal of the BIOS chip.

* * * * *